United States Patent [19]
Banas et al.

[11] Patent Number: 4,691,093
[45] Date of Patent: Sep. 1, 1987

[54] TWIN SPOT LASER WELDING

[75] Inventors: Conrad M. Banas, Bolton; Brian M. Doyle, East Hartford, both of Conn.

[73] Assignee: United Technologies Corporation, Hartford, Conn.

[21] Appl. No.: 854,633

[22] Filed: Apr. 22, 1986

[51] Int. Cl.⁴ .............................................. B23K 26/00
[52] U.S. Cl. ................... 219/121 LC; 219/121 LD; 219/121 LS; 219/121 LT; 219/121 LQ
[58] Field of Search ................. 219/121 LC, 121 LD, 219/121 LS, 121 LT, 121 LQ, 121 LW; 350/607, 611

[56] References Cited

U.S. PATENT DOCUMENTS

| | | | |
|---|---|---|---|
| 3,473,000 | 10/1969 | Siekman et al. | 219/121 LD |
| 3,622,740 | 11/1971 | Ravussin | 219/121 |
| 3,827,782 | 8/1974 | Boudouris et al. | 350/607 |
| 3,860,784 | 1/1975 | Brown et al. | 219/121 LM |
| 4,091,274 | 5/1978 | Angelbeck et al. | 350/611 X |
| 4,271,347 | 6/1981 | Svenson | 350/607 X |
| 4,275,288 | 6/1981 | Makosch et al. | 219/121 |
| 4,315,130 | 2/1982 | Inagaki et al. | 219/121 |
| 4,319,122 | 3/1982 | Pope | 219/121 |
| 4,425,026 | 1/1984 | Lien | 350/295 |
| 4,461,947 | 7/1984 | Ward | 219/121 |
| 4,527,043 | 7/1985 | Hashiura | 219/121 |
| 4,537,478 | 8/1985 | Richter | 350/161 |

FOREIGN PATENT DOCUMENTS

| | | | |
|---|---|---|---|
| 0007592 | 2/1985 | Japan | 219/121 LD |
| 0044192 | 3/1985 | Japan | 219/121 LQ |

*Primary Examiner*—C. L. Albritton
*Attorney, Agent, or Firm*—Peter R. Ruzek; J. Kevin Grogan

[57] ABSTRACT

A novel multiple spot laser welding apparatus includes a bendable mirror capable of deformation, which receives a laser beam at a single reflective surface thereof. A deformation device deforms the single reflective surface of the bendable mirror to provide a plurality of laser sub-beams to a workpiece, generating laser spots on surfaces thereof. The apparatus can be used in a laser welding method that provides a common weld pool formed by laser spots transverse to the weld seam. Another laser welding method provides multiple laser spots oriented along a weld seam producing a common weld pool therebetween. Still another laser welding method provides multiple laser spots along a weld seam producing distinct weld pools.

6 Claims, 5 Drawing Figures

TWIN SPOT LASER WELDING

DESCRIPTION

1. Technical Field

This invention relates to laser welding and more particularly to laser welding characterized by multiple focal spots.

2. Background Art

Laser welding has been extensively developed in the years since the advent of high power lasers. Of principal significance has been the development of the deep-penetration ("keyhole") welding technique which is made possible by the high power density afforded by the laser. Brown, et al disclosed a laser welding method in the commonly owned U.S. Pat. No. 3,860,784 entitled "Deep Penetration Welding Using Lasers". In deep-penetration/laser welding, the focused laser beam vaporizes a thin column of material through the workpiece thereby permitting direct beam energy delivery into the depths of the workpiece. With appropriate relative motion between the material and the focused beam, the "keyhole" is translated through the material thereby forming a narrow, high-depth-to-width ratio fusion zone which can be duplicated only with electron beam equipment. Deep-penetration welds are characterized by high welding speed/low specific energy input, reduced thermal distortion and significant reduction in thermal effects on material adjacent to the fusion zone. In contrast, more conventional welding processes produce roughly hemispherical weld beads since energy is delivered only to the workpiece surface and is transferred into the material by thermal diffusion which proceeds uniformly from the surface for an isotropic material.

In many applications, however, it is desirable to modify the deep-penetration bead profile in order to attain required structural integrity. Some of the reasons for modification include: (1) poor fit-up of the mating surfaces, (2) reduction of seam tracking tolerance requirements, (3) reduction in fusion zone cooling rate to enhance mechanical properties, (4) increasing the dwell time in the liquid state to permit adequate material interchange at the weld interface, (5) reduction in the average interaction intensity at the workpiece to reduce fusion zone porosity, (6) reduction in plasma generation and (7) extension of processing capability to specific joint configurations, e.g., an offset step joint, which mandate a broader bead profile for complete interface fusion. In the past, one solution to this problem has involved the use of multiple offset passes over the same weld seam. Another approach has been to broaden the weld bead by mechanically scanning the beam at the interaction point in controlled fashion. Besides mandating additional cost and complexity, these techniques often produce irregular bead profiles.

The prior art includes a class of deformable mirrors capable of compensating for atmospheric induced phase deformations in optic wavefronts. These devices are extraordinarily complex and expensive, therefore their use is customarily restricted to military applications.

The prior art also includes devices which optically divide a beam from a single laser to create multiple beams. However, many applications require very high power. Devices which have a multiple beam configuration employ a plurality of beam splitters and mirrors. These supplemental optics have diffraction limitations as a result of edge effects, restricting effectiveness in those applications calling for multiple beams with partial or no beam superposition. Multiple lasers present the obvious disadvantage of increased cost and complexity.

DISCLOSURE OF INVENTION

An object of the present invention is to provide apparatus for laser welding of workpieces using multiple laser spots. Another object of the present invention is to provide a method of laser welding of rough fit-up workpieces using transversely separated twin laser spots. Another object of the present invention is to provide a method of laser welding of workpieces using twin laser spots linearly displaced along a weld producing a common weld pool. Still another object of the present invention is to provide a method of laser welding of workpieces using twin laser spots linearly displaced along a weld producing a plurality of weld pools.

According to the present invention, a multiple spot laser welding apparatus responsive to an external signal for laser welding workpieces each having a surface and which abut forming a weld seam includes an axially bendable mirror for receiving a laser beam at a single reflective surface thereof. The mirror reflects therefrom a plurality of focused sub-beams. Also included is a deformation means adapted to receive the bendable mirror. In response to an external signal the deformation means deforms the single reflective surface along at least one axis. A laser sub-beam plurality is provided from the single reflective surface to the workpiece surfaces forming respective laser spots thereon.

According to another aspect of the present invention, a transverse spot method of laser welding abutting workpieces roughly fit-up at a weld seam thereof using twin laser spots includes the step of generating simultaneously on the surfaces approximately transverse to the weld seam first and second laser spots separated by a distance to form a common weld pool therebetween. The method also includes the step of moving the first and second laser spots along the weld seam maintaining the common weld pool.

According to another aspect of the present invention, a trailing pool method of laser welding workpieces fit-up at a weld seam thereof includes the step of generating simultaneously approximately on the weld seam first and second laser spots separated by a distance forming a common weld pool therebetween. The method further includes moving the laser spots along the weld seam maintaining the common weld pool.

According to still another aspect of the present invention, a trailing spot method of laser welding workpieces fit-up at a weld seam thereof includes the step of generating simultaneously first and second laser spots approximately along the weld seam separated by a distance forming separate weld pools therealong. The method further includes moving the laser spots along the weld seam maintaining the weld pools.

BEST MODE FOR CARRYING OUT THE INVENTION

Figure 1:
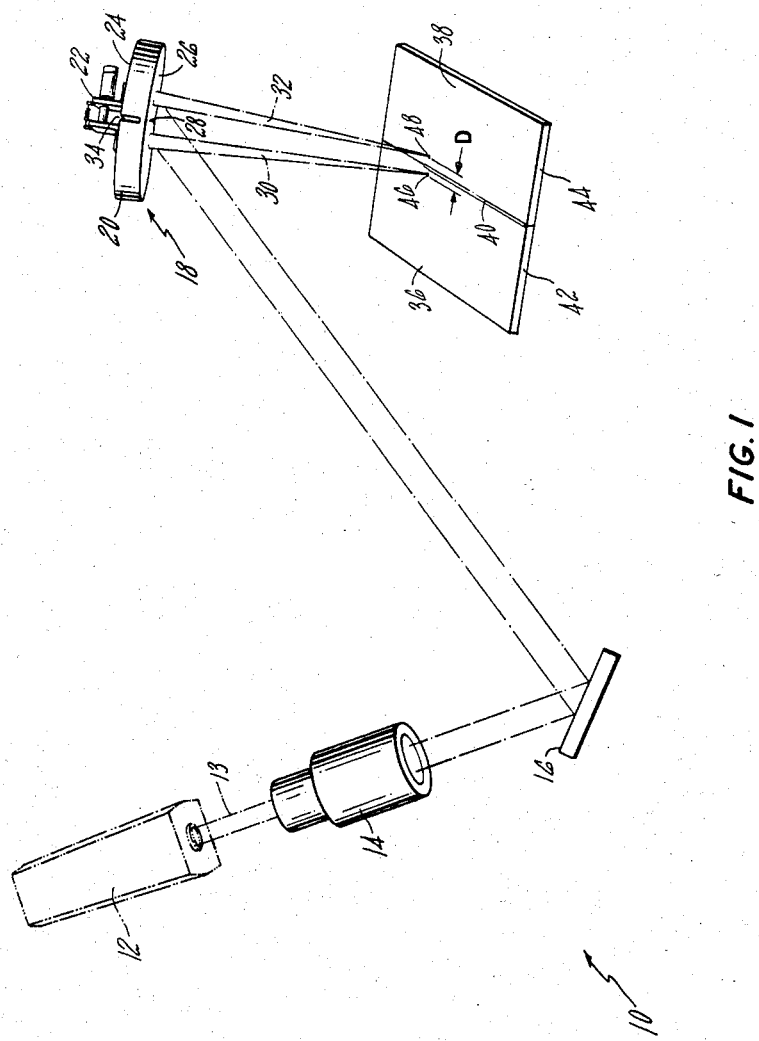
FIG. 1 is a schematic illustration of a twin focal spot laser welding apparatus provided according to the present invention.

Referring now to FIG. 1, in a schematic illustration of a twin spot laser welding apparatus demonstrating a twin spot laser welding method provided according to the present invention, a twin spot laser welding system 10 includes a high power laser 12 capable of continuous delivery of a power density greater than or equal to approximately $10^6 W/cm^2$ (deep-penetration threshold), typically a convectively cooled $CO_2$ laser. The laser provides a CW beam 13 of approximately 5 kW average power or greater. The spot power density in each beam spot must equal or exceed $10^6 W/cm^2$ threshold power requirement. The beam is directed to the workstation by conventional transfer optics 14 such as metal mirrors. Those skilled in the art will note that other, conventional directing and focusing optics appropriate for use with very high power laser beams may and can be included herewith as required by the specific application, such as beam directing mirror 16.

The laser beam is subsequently provided to twin spot focussing optics 18 comprising bendable mirror 20 adapted to receive mirror deformation apparatus 22 at a back surface 24 thereof. The mirror has a reflective surface 26 which can focus a laser beam of high power. In the best mode embodiment the mirror comprises a cooled copper block configured as a spherical mirror. In addition, the mirror reflective surface must be able to bend along at least one deformation axis 28 to produce sub-beams 30 and 32 exiting the reflective surface. In order to facilitate bending, certain modifications to the structure of the mirror may have to be made. For the mirror used in the best mode embodiment, notch 34 has been fabricated to a depth readily permitting deformation.

The deformation apparatus is of a conventional type and in the best mode embodiment comprises a micrometer mechanism affixed to the back surface of the mirror. Those skilled in the art will note that other equivalent mechanisms can be substituted including those that are manually adjustable or responsive to external signals, such as a conventional stepper motor.

Moreover, those skilled in the art will note that the multiple spot focussing optics can be modified to provide a plurality of deformation axes, yielding a plurality of sub-beams as desired.

Referring again to FIG. 1, the two sub-beams are focused on surfaces 36 and 38 at weld seam 40 formed by abutting workpieces 42 and 44. The sub-beams form spots 46 and 48 separated by a distance (D). The sub-beams are guided along the weld seam to perform the weld by conventional optical apparatus or, conversely, by movement of the respective workpieces. The workpieces themselves can be comprised of any weldable metals and alloys including aluminum, stainless steel and those detailed hereinbelow. Weld underfill will occur if the gap between workpieces at the weld seam exceeds approximately 3% of the workpiece thickness unless a filler, such as metal wire is used.

With the the present invention two or more regions of the weld seam can be energized simultaneously. The number of focal spots corresponds to twice the number of deformation axes. The separation distance (D) between spots can be adjusted between zero and a maximum interaction distance which depends on many factors, including the type of metal, power of the laser and weld speed. Unlike those of the prior art, laser welding apparatus and technique provided according to the present invention are not encumbered by requirements for mechanical motion of the generating optics.

As provided according to the present invention, power distribution in the individual spots is not a function of separation distance. Power division depends on location of the deformation axis relative to the incoming laser beam. Substantially no fringing occurs as the spot separation distance is varied. Consequently, the present invention provides for a variety of novel welding techniques, some of which are detailed hereinafter, which can be used to substantially improve the quality and lower the cost associated with laser welding.

FIGS. 2a to 2d show different sectional weld seam profiles at different transverse spot separations. As detailed hereinabove, the laser welding apparatus of FIG. 1 can be configured to deform the mirror along one axis so as to generate two sub-beams of equal power oriented transverse to a weld seam. The weld parameters of FIGS. 2a to 2d include a total laser power of 6 kW, weld speed of 80 inches per minute and workpiece thickness of 0.1 inch.

Figure 2A:
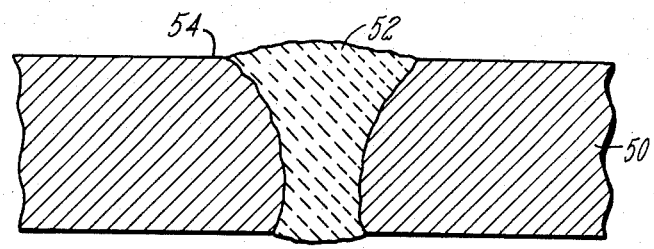
FIGS. 2a to 2d are sectioned weld seam profiles demonstrating the effect of transverse spot separation on the weld.
Figure 2B:
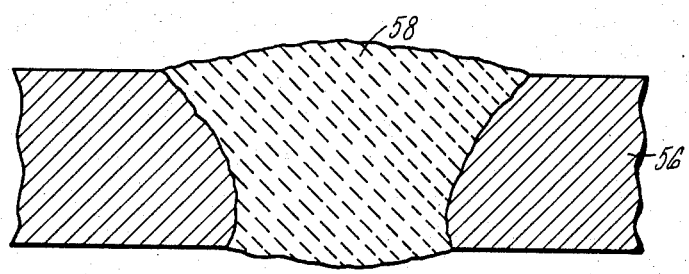
Figure 2C:
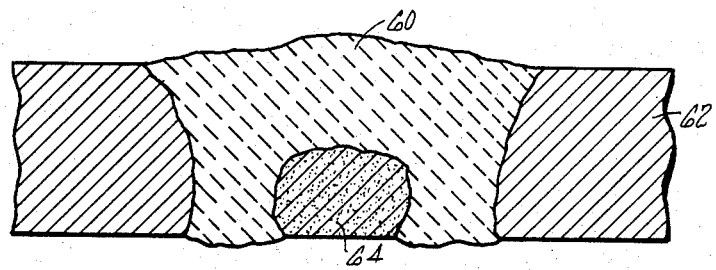
Figure 2D:
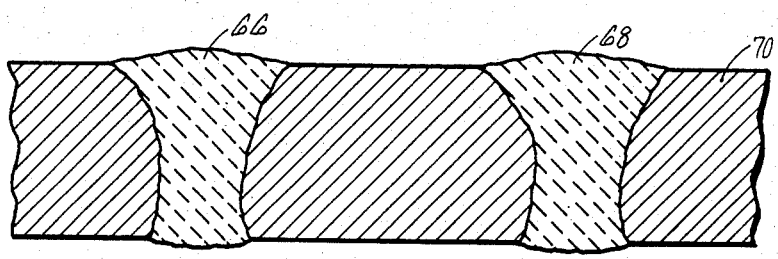

FIG. 2a is a sectioned illustration showing a weld profile having zero separation between sub-beam focal spots. Visible are metal workpiece 50 and weld zone 52. As in all of FIG. 2, the laser sub-beams are incident on top surfaces such as top surface 54 of the workpiece. FIGS. 2b and 2c demonstrate weld seam broadening accomplished by adjusting the separation distance between spots. FIG. 2b illustrates workpiece 56 and weld zone 58 with a transverse spot separation of approximately 0.065 inch. Note that the weld zone extends completely through the workpiece and is contiguous throughout, such that the weld seam width exceeds the workpiece thickness; this is not possible using a single spot. FIG. 2c shows weld zone 60 within workpiece 62 formed with a spot separation of approximately 0.10 inch. The weld zone is only partially contiguous. Workpiece region 64 remains unfused by the welding process, although some change in microstructure is noted. FIG. 2d shows a pair of weld zones 66 and 68 separated by approximately 0.125 inch within workpiece 70. At this separation no zone interaction can be seen.

The laser welding apparatus and technique provided according to the present invention enables workpieces having poor fitup to be welded without the need for multiple passes, or beam rotation. In addition to the transverse welding technique described hereinabove, the present invention provides for "trailing spot" and "trailing pool" welding methods. If the apparatus of FIG. 1 is configured so that the sub-beam focal spots lie on the weld seam and move therealong, a single elongated meltpool is formed at small spot separations, while for larger separations two meltpools will form.

Prior art welding techniques have attempted to overcome weld bead drawback (humping) associated with high speed welding. A discussion of this problem in the context of electron beam welding is found in "Tandem Electron Beam Welding (Report-I)" by Yoshiaki Arata, et al found in the Transactions of the Japanese Welding Research Institute of Osaka, Vol. 7, No. 1, 1978. At high speeds a single meltpool does not dwell long enough for stability. As a result, the weld is characterized by irregular bead formations such as humping and undercutting. A trailing pool welding method provided according to the present invention extends the melt time by increasing the meltpool length along the seam. The length of the meltpool is a function of the spot separation. Fluid instability in the weld bead is reduced, allowing for high weld speeds without humping.

An additional problem solved by the trailing pool welding method of the present invention is that of "worm holing" associated with high speed welding. The single elongated meltpool provides longer melt times and prevents pull away of material in the melt zone thereby permitting sound joint formation at higher weld speeds.

A trailing spot welding method provided according to the present invention generates distinct weld pools trailing along the weld seam. For many applications proper final microstructure in the weld zone requires more than one weld pass or preheating above a certain temperature. The trailing spot welding method provides for levels of weld seam preheat for the second or final (with appropriate changes to the apparatus) weld pass that is virtually unattainable in the prior art. High levels of preheat are essential for crack free welds of certain alloys such as IN-718. Moreover, preheating is accomplished at the same speed as the weld. Tremendous savings in time and energy are realized since only the seam to be welded is heated instead of entire structures, as was common in the prior art.

The multiple spot laser welding techniques detailed hereinabove also provide means for control of average melt temperature and cooling rate. This provides the potential for control of fusion zone microstructure, reduction in plasma generation and extension of laser welding capabilities to normally difficult to weld materials such as aluminum. Overheating of the meltpool and excessive plasma formation are two of the principal reasons for poor laser welding results in aluminum alloys with single spot processes of the prior art.

An alternative embodiment of the apparatus provided according to the present invention provides for hole generation of preselected diameter of a selected geometry. The embodiment includes a bendable focusing mirror which is rotated about an axis approximately perpendicular to the center of the deformation axis.

Similarly, although the invention has been shown and described with respect to a best mode embodiment thereof, it should be understood by those skilled in the art that various other changes, omissions and additions thereto may be made therein without departing from the spirit and scope of the invention. This would include, for example, various combinations of transverse and trailing pool laser welding techniques.

We claim:

1. Multiple spot laser welding apparatus responsive to an external signal for laser welding of workpieces each having a surface, and each abutting at a weld seam, comprising:

a one-piece mirror receiving a laser beam at a single reflective surface thereof and including a plurality of mirror sections having respective portions of said single reflective surface for reflecting a plurality of focused sub-beams, and at least one bendable hinge portion integral with and pivotably interconnecting said mirror sections; and deformation means adapted to receive said mirror sections and pivoting the same about said hinge portion for adjustably positioning said sub-beam plurality on workpiece surfaces at the weld seam forming respective spots thereon.

2. The apparatus of claim 1 wherein said mirror is rotatable relative to said workpiece surfaces about an axis approximately perpendicular thereto, moving said spot plurality in an approximate circular fashion thereon.

3. The apparatus of claim 1 wherein said deformation means positions along the weld seam each of said spot plurality linearly disposed thereon at distance therebetween.

4. The apparatus of claim 1 wherein said spot plurality comprises first and second spots separated by a distance, positioned approximately transverse to the weld seam.

5. A trailing pool method of laser welding abutting workpieces at a weld seam using twin laser spots focused on surfaces thereof, comprising the steps of:

generating approximately along said weld seam simultaneously first and second laser spots arranged in direction of said weld seam from each other and separated by a distance, forming a common weld pool trailing therebetween; and moving said first and second laser spots in said direction along the weld seam such that one of said laser spots trails the other, while maintaining said common weld pool.

6. A trailing spot method of laser welding abutting workpieces at a weld seam using multiple laser spots focused on surfaces thereof, comprising the steps of:

generating simultaneously approximately on said weld seam first and second laser spots arranged in direction of said weld seam from each other and separated by a distance forming first and second weld pools thereon, moving said first and second laser spots in said direction along the weld seam such that one of said laser spots trails the other while maintaining said first and second weld pools.

* * * * *